US009216680B2

(12) United States Patent
Hagenbuch (10) Patent No.: US 9,216,680 B2
(45) Date of Patent: Dec. 22, 2015

(54) HARD ROCK MINED ORE TRUCK BODY (71) Applicant: LeRoy G. Hagenbuch, Peoria Heights, IL (US)

(72) Inventor: LeRoy G. Hagenbuch, Peoria Heights, IL (US)

( * ) Notice: Subject to any disclaimer, the term of this patent is extended or adjusted under 35 U.S.C. 154(b) by 0 days.

(21) Appl. No.: 13/654,157

(22) Filed: Oct. 17, 2012

(65) Prior Publication Data

US 2013/0094936 A1    Apr. 18, 2013

Related U.S. Application Data (60) Provisional application No. 61/548,136, filed on Oct. 17, 2011.

(51) Int. Cl.
*B60P 1/28* (2006.01)
*B62D 25/20* (2006.01)

(52) U.S. Cl.
CPC ............. *B60P 1/286* (2013.01); *B62D 25/2054* (2013.01); *B62D 25/2072* (2013.01)

(58) Field of Classification Search
CPC ............ B60P 1/286; B60P 1/283; B60P 1/28; B62D 33/02; B62D 25/2054; B62D 25/2072; B60R 13/01; B65F 3/26; F27D 1/0006; B22D 41/02; C21B 7/06; C21C 5/44; B65G 67/24; B65G 67/30; B65D 88/548
USPC .................. 296/183.2, 184.1, 39.2; 280/6.15; 414/469, 572, 575, 471, 472, 476, 482, 414/487; 298/17 R; 266/280, 282, 283
See application file for complete search history.

(56) References Cited

U.S. PATENT DOCUMENTS

| | | | | | |
|---|---|---|---|---|---|
| 1,627,336 | A | * | 5/1927 | Nelson | 296/183.2 |
| 2,974,997 | A | * | 3/1961 | Grant et al. | 296/182.1 |
| 3,134,628 | A | * | 5/1964 | Lackey et al. | 298/21 R |
| 3,363,933 | A | * | 1/1968 | Wilson | 296/183.2 |
| 3,578,375 | A | * | 5/1971 | Finefrock | 296/39.2 |
| 5,460,431 | A | * | 10/1995 | McWilliams | 298/22 AE |
| 5,476,285 | A | * | 12/1995 | Dickerson | 280/781 |
| 5,803,531 | A | * | 9/1998 | Nielsen | 296/184.1 |
| 6,129,409 | A | * | 10/2000 | D'Amico | 296/183.2 |
| 6,174,014 | B1 | * | 1/2001 | Hook et al. | 296/39.2 |
| 6,305,731 | B1 | * | 10/2001 | Hook et al. | 296/39.2 |
| 6,637,808 | B1 | * | 10/2003 | Ling et al. | 296/183.2 |
| 7,025,407 | B2 | * | 4/2006 | Medel | 296/183.2 |
| 7,100,256 | B2 | * | 9/2006 | D'Amico et al. | 29/401.1 |

(Continued)

OTHER PUBLICATIONS

International Search Report and Written Opinion from co-pending International Application No. PCT/US2012/60632.

*Primary Examiner* — Glenn Myers
(74) *Attorney, Agent, or Firm* — Leydig, Voit & Mayer, Ltd.

(57) ABSTRACT

A truck body designed for transporting hard rock mined ore. The truck body includes a body floor having a first material forming a floor structure and a liner structure including a second material covering at least a portion of the floor structure. The second material has a hardness that is greater than a hardness of the first material and prevents wear of the truck body floor by the hard rock ore. The truck body includes a front wall and two opposing body sidewalls that taper outwardly from front to rear of the truck body such that a width between the body sidewalls at a rear of the truck body is at least 10% greater than a width at the front of the truck body. The outward tapering of the body sidewalls promotes movement of the load away from the body sidewalls as the load is released from the truck body.

21 Claims, 11 Drawing Sheets

(56) References Cited

U.S. PATENT DOCUMENTS

| | | | |
|---|---|---|---|
| 2002/0180240 A1* | 12/2002 | Fujan et al. | 296/184 |
| 2002/0180241 A1* | 12/2002 | Fujan et al. | 296/184 |
| 2004/0026959 A1 | 2/2004 | Kostecki | |
| 2006/0202509 A1* | 9/2006 | Westner | 296/183.2 |
| 2008/0067856 A1 | 3/2008 | Hagenbuch | |
| 2009/0015028 A1* | 1/2009 | Zamorano Jones | 296/39.2 |
| 2010/0096113 A1 | 4/2010 | Varanasi et al. | |
| 2014/0054925 A1* | 2/2014 | Hyde et al. | 296/183.2 |

* cited by examiner

HARD ROCK MINED ORE TRUCK BODY

CROSS-REFERENCE TO RELATED APPLICATIONS

This patent application claims the benefit of U.S. Provisional Patent Application No. 61/548,136, filed Oct. 17, 2011, which is incorporated by reference.

TECHNICAL FIELD OF THE INVENTION

This invention generally relates to a truck body and more particularly to a truck body for hauling mined ores such as iron ore and other similar "hard rock mineral" ores. This invention further relates to both the design of an truck body and the use of certain highly wear resistant materials in combination with the truck body design to produce a superior Hard Rock Mined Ore Truck Body for transporting "hard rock" mined ores like iron ore in an iron ore mine, copper ore in a copper mine, and other similar hard rock mineral ores.

BACKGROUND OF THE INVENTION

Referring specifically to iron ore, iron is the world's most commonly used metal "steel" of which iron ore is the key ingredient, representing almost 95% of all metal used in a year.

Iron ore is the raw material used to make pig iron, which is one of the main raw materials used to make steel. 98% of the mined iron ore is used to make steel. In fact, iron ore is more integral to the world's economy than any other commodity except oil/fuel.

The principle ores of iron are hematite (70% iron) and magnetite (72% iron). Ore is typically found in magnetite and hematite minerals. Hematite is an iron oxide as is magnetite.

Initially, iron ore was predominately mined from hematite deposits with grades in excess of 60% iron. Such deposits are commonly referred to as "direct shipping ores" or "natural ores". With depletion over time of high grade hematite deposits, lower grade ores have been further developed. This development of lower grade iron ores has led to the development of taconite iron ore.

Taconite is a "low grade" iron ore, only containing about 30% magnetite/hematite. This taconite iron ore comprises only small particles of magnetite and hematite interspersed with a very tough variety of quartz—chert. Chert is an extremely hard abrasive mineral.

To measure, in a relative way, the hardness of various materials such as chert, magnetite, hematite and other minerals, the Mohs scale, a relative measurement tool, was created in 1812 by the German geologist and mineralogist Friedrich Mohs. The Mohs scale of mineral hardness characterizes the scratch resistance of various minerals through the ability of a harder material to scratch a softer material.

The basic premise behind the Mohs scale is that, in order to identify (or bracket) the hardness (abrasion resistance) of a material an attempt is made to scratch a sample of the material with various materials listed on the Mohs scale of materials, until a particular material on the Mohs scale is identified that will scratch the sample of unknown material, while the Mohs scale "control" material is not scratched.

This same premise applies to truck bodies. As long as the material forming the truck body is higher on the Mohs scale than the material being hauled, there will be little to any abrading away (abrasion) of the load containing surfaces of the truck body. However, if the material being hauled in the truck body is higher on the Mohs scale than the material forming the truck body, then the floor, side plates, etc. of the truck body will be worn away (abraded) with every load hauled.

The original Mohs scale comprised the hardness/abrasion resistance numbers 1 thru 10, with 1 being the softest and 10 being the hardest, as shown in Table 1 below. Alternative Vickers hardness numbers (HV) (another way of comparing relative material hardenesses) are also shown by comparison.

TABLE 1

Mohs scale of mineral hardness

| Mineral | Mohs Hardness | Vickers HV |
|---|---|---|
| Talc | 1 | 20 HV |
| Gypsum | 2 | 70 HV |
| Calcite | 3 | 110 HV |
| Fluorite | 4 | 180 HV |
| Apatite | 5 | 500 HV |
| Orthoclase | 6 | 720 HV |
| Quartz | 7 | 1280 HV |
| Chromium Carbides | — | 1500 HV |
| Topaz | 8 | 1620 HV |
| Molybdenum Carbides | — | 1800 HV |
| Corundum | 9 | 2000 HV |
| Titanium Carbides | — | 3000 HV |
| Diamond | 10 | 9000 HV |

Over time the ten items first identified in the Mohs scale, which really only denotes relative hardness, required expanding to a more defined comparative hardness level and the Vickers scale was introduced to more clearly delineate relative hardness of materials.

The hardness of a material is further defined as the material's resistance to another material penetrating the material's surface and is related to the material's abrasion/wear resistance and strength. Higher hardness is generally related to higher strength, which in turn is related to the material's structure.

The Vickers hardness is defined by test standards, and requires a square pyramid indenter made of diamond to be pressed into a test sample at a specified load. The resulting indentation is then measured from tip to tip in both axes. The average measurement is converted to a Vickers hardness value according to a formula or a chart based on the formula.

Table 2 is a comparison between the Mohs number for various materials and a Vickers hardness number.

TABLE 2

Comparison of Mohs hardness and Vickers hardness for various materials

| Mineral Name | Hardness (Mohs) | Hardness (Vickers) kg/mm$^2$ |
|---|---|---|
| Graphite | 1-2 | $VHN_{10}$ = 7-11 |
| Tin | 1½-2 | $VHN_{10}$ = 7-9 |
| Bismuth | 2-2½ | $VHN_{100}$ = 16-18 |
| Gold | 2½-3 | $VHN_{10}$ = 30-34 |
| Silver | 2½-3 | $VHN_{100}$ = 61-65 |
| Chalcocite | 2½-3 | $VHN_{100}$ = 84-87 |
| Copper | 2½-3 | $VHN_{100}$ = 77-99 |
| Galena | 2½ | $VHN_{100}$ = 79-104 |
| Sphalerite | 3½-4 | $VHN_{100}$ = 208-224 |
| Heazlewoodite | 4 | $VHN_{100}$ = 230-254 |
| Carrollite | 4½-5½ | $VHN_{100}$ = 507-586 |
| Goethite | 5-5½ | $VHN_{100}$ = 667 |
| Hematite | 5-6 | $VHN_{100}$ = 1,000-1,100 |
| Chromite | 5½ | $VHN_{100}$ = 1,278-1,456 |

TABLE 2-continued

Comparison of Mohs hardness and Vickers hardness for various materials

| Mineral Name | Hardness (Mohs) | Hardness (Vickers) kg/mm² |
|---|---|---|
| Anatase | 5½-6 | $VHN_{100}$ = 616-698 |
| Rutile | 6-6½ | $VHN_{100}$ = 894-974 |
| Pyrite | 6-6½ | $VHN_{100}$ = 1,505-1,520 |
| Bowieite | 7 | $VHN_{100}$ = 858-1,288 |
| Euclase | 7½ | $VHN_{100}$ = 1,310 |
| Chromium | 9 | $VHN_{100}$ = 1,875-2,000 |

Referring specifically to iron ore, on the Mohs scale and on the Vickers hardness scale, the basic components of taconite iron ore are shown in Table 3.

TABLE 3

Mohs hardness and Vickers hardness for components of taconite iron ore

| Mineral Name | Hardness (Mohs) | Hardness (Vickers) |
|---|---|---|
| Hermatite | 5.5 to 6.5+ | 1,000 to 1,100 |
| Magnetite | 6.5+ | 1,100 |
| Quartz (chert) | 7 | 1275 |

Referring to the steels used in producing truck bodies, typical high strength, high hardness steel used today in producing truck bodies has a basic maximum hardness of 450 Brinell. (The Brinell scale being the industry standard for hardness calculations of steel in this field.) In some highly abrasive truck body applications, a high hardness 600 Brinell steel or higher with minimal structural strength characteristics can also be used.

Having introduced Brinell along with the previously described Mohs scale and Vickers scale, it is important to understand the relationship between the following three material measurements:

1. Mohs Scale
2. Vickers
3. Brinell

The Vickers HV number is determined by the ratio F to A where "F" is the force applied to the material, and "A" is the surface area of the resulting indentation. The Vickers is used as an alternative to the Brinell method, and is different than the Mohs hardness scale which tests a material's scratch resistance.

The Brinell hardness scale is very similar to the Vickers hardness scale and was developed by a Swedish engineer named Johan August Brinell in 1900. The Brinell test utilizes a 10 mm diameter steel ball as an indenter, applying a uniform 3,000 kgf (29 kN) force. (A smaller amount of force is used on softer materials, and a tungsten carbide ball is used for harder materials.)

With the Mohs scale, the hardness of a sample is measured against standard test materials by finding the hardest material the sample can scratch, and/or by identifying the softest test material that can scratch the sample. For example, if a given sample can be scratched by quartz (Mohs 7) but not by topaz (Mohs 8), the sample has a hardness between 7 and 8 and is possibly about 7.5 on the Mohs scale.

TABLE 4

Comparison of Vickers and Brinell

| Vickers Hardness | Brinell Hardness 10 mm tungsten carbide ball |
|---|---|
| — | Load 3000 kg |
| 940 | — |
| 920 | — |
| 880 | (767) |
| 840 | (745) |
| 800 | (722) |
| 760 | (698) |
| 720 | (670) |
| 690 | (647) |
| 670 | (630) |
| 650 | 611 |
| 630 | 591 |
| 610 | 573 |
| 590 | 554 |
| 570 | 535 |
| 550 | 517 |
| 520 | 488 |
| 500 | 471 |
| 480 | 452 |
| 460 | 433 |
| 440 | 415 |
| 420 | 397 |

It is readily apparent from Table 4 that the 450 Brinell high strength, high hardness steel commonly used in the manufacture of truck bodies has (only) a Vickers number of 480 and from Table 2 a corresponding Mohs scale number of about 4.75 which is far below the Vickers number of 1,000 to 1,275 (see Table 3) of hauled hard rock mineral ores such as iron ore and/or similar hard rock ores.

And, just as iron ore has a higher Vickers number than that of the high strength/high hardness steels commonly used to produce a typical truck body, there are many other mined hard rock ores that also have higher Vickers numbers than those of the steels used to produce conventional truck bodies.

SUMMARY OF THE INVENTION

An aspect of the present invention is to provide a truck body capable of hauling hard rock mineral ore without being susceptible to high abrasion rates. In particular, the truck body is adapted to haul materials having hardnesses that are greater than that of steel typically used for the structural components of truck bodies, for example, materials having a hardness that is higher than 450 or 600 Brinell (Vickers 480 or 630).

This aspect of the invention can be achieved by a truck body including a combination of features adapted to prevent abrasion of the load containing surfaces of the truck body.

First, the truck body floor, which is inevitably subjected to contact with hard rock material as it slides and is dumped from the truck body, is provided with a liner structure made of a material having a hardness that is higher than the hardness of the underlying floor surface and that is also higher in hardness than the hard rock mined ore. Due to the hardness of the liner structure, the truck body floor is protected from abrasion as the hard rock mined ore slides from truck body floor when it is dumped.

The truck body also includes body sidewalls having an extreme outward taper from the front of the truck body to the rear of the truck body. For example, the tapering of the body sidewalls results in a rear truck body sidewall width that is at least 10% greater than the body sidewall width at the front of the truck body. As a result of the outward body sidewall taper from the front of the truck body to the rear of the body, the hauled material effectively recedes from the body sidewalls as it slides from the truck body as the load is dumped. The relative movement of the load away from the body sidewalls prevents the hauled material from scraping against the body sidewalls during dumping. Accordingly, this body sidewall tapering provides an effective means to prevent abrasion of the truck body sidewalls.

In an embodiment, the present invention provides a truck body for transporting hard rock mined ore. The truck body includes a body floor having an edge at which the hard rock mined ore loaded into the body is released when the body is moved into a dumping position. The body floor includes a first material forming a body floor structure and a second material forming a liner structure covering at least a portion of the body floor structure. The second material has a hardness that is higher than a hardness of the first material, such that the liner structure protects the body floor structure from abrasion during load dumping. A body front will confines a load of the hard rock mined ore at a front of the truck body and two opposing body sidewalls confine the load at opposing sides of the truck body. The body sidewalls taper outwardly from front to rear of the truck body such that the width between the body sidewalls at the rear of the truck body is at least 10% wider than the width between the body sidewalls at the front of the truck body. The outward tapering of the body sidewalls promotes movement of the load away from the body sidewalls as the load is dumped from the truck body, thereby minimizing abrasion of the truck body sidewalls during dumping.

In another embodiment, the present invention provides a method of transporting hard rock mined ore using a truck. A load of hard rock mined ore including a material having a high hardness is deposited into a truck body. The truck body includes a floor having an edge at which the load of hard rock mined ore in the truck body is released when the body is moved into a dumping position and includes a first material forming the truck body floor structure that has a hardness below the hauled hard rock mined ore hardness and a body liner structure of a second material with a hardness that is greater than the hauled hard rock mined ore hardness and that covers at least a portion of the truck body floor surface. A truck body front wall confines the load of hard rock mined ore at the front of the truck body and two opposing body sidewalls confine the load at the sides of the truck body. The body sidewalls taper outwardly from front to rear of the truck body such that the width between the truck body sidewalls is at least 10% greater at the rear of the truck body than at the front of the truck body. In dumping, as the truck body is pivoted upward the load of hard rock mined ore slides out of the truck body while the outward tapering body sidewalls confining the load recede away from the load thus sliding out. The outwardly tapering body sidewalls minimize abrasion of the body sidewalls by the hard rock mined ore. Further, the floor surface of the truck body floor is protected from abrasion by the body liner structure.

BRIEF DESCRIPTION OF THE DRAWINGS

Exemplary embodiments of the present invention are described in more detail below, with reference to the drawings, in which.

DETAILED DESCRIPTION

FIGS. 1-8 illustrate various embodiments of a specially designed truck body configured to haul materials of a sufficient hardness to cause rapid abrasion of the load containment surfaces of an ordinary truck body. Each of the illustrated embodiments combines the use of a liner structure on at least a portion of the truck body floor to prevent abrasion of the floor surface along with an extreme outward tapering of the body sidewalls from the front to the rear of the truck body. The resulting truck bodies are protected from abrasion on the truck body floor by the robust floor liner structure and, due to the outward tapering body sidewalls, are protected from abrasion on the body sidewalls by avoiding contact with the hauled materials during load dumping.

Figure 1:
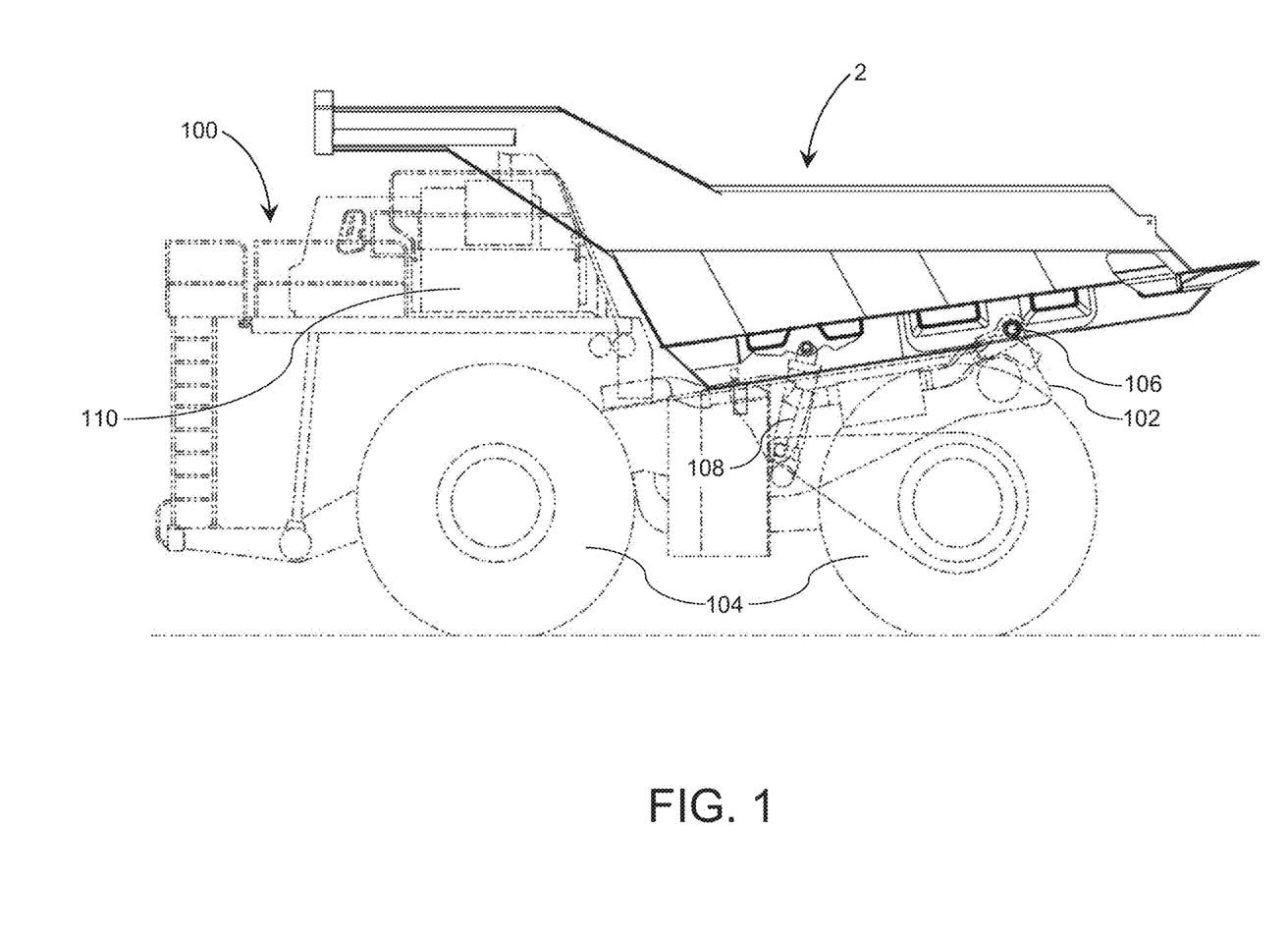
FIG. 1 is a side view of a truck for hauling materials with the truck body in a lowered position.
Figure 2:
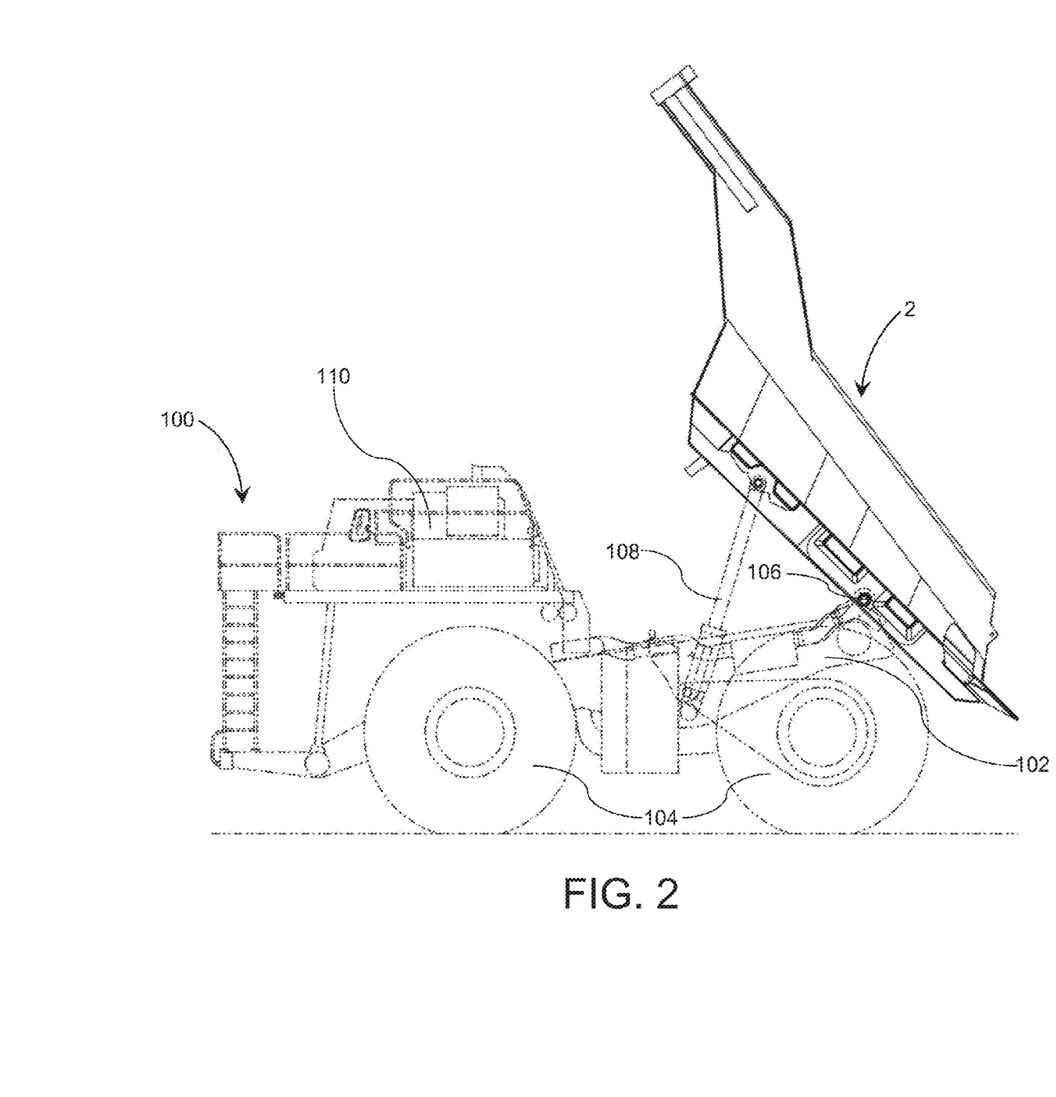
FIG. 2 is the truck of FIG. 1 with the truck body in a raised position.

Referring to FIG. 1, a vehicle 100 for hauling hard rock mined ore includes a frame 102 supported by wheels 104 configured to transport the vehicle between loading sites and dumping sites. A truck body 2 is supported on the frame and is specifically constructed for carrying hard rock mined ores without being subject to rapid abrasion, as explained in more detail above. The truck body 2 is fixed on the frame 102 at a pivot point 106 toward the rear of the vehicle and can be rotated as shown in FIG. 2, about the pivot point 106 by hydraulic cylinders 108 (one shown) that lift the front end of the truck body 2. As a result, material that has been loaded into the truck body 2 is dumped from the rear of the truck body 2 when the truck body is raised. Operation of the vehicle, including vehicle movement and truck body raising and lowering as performed by an operator seated in the cab 110 at the front of the vehicle.

Figure 3:
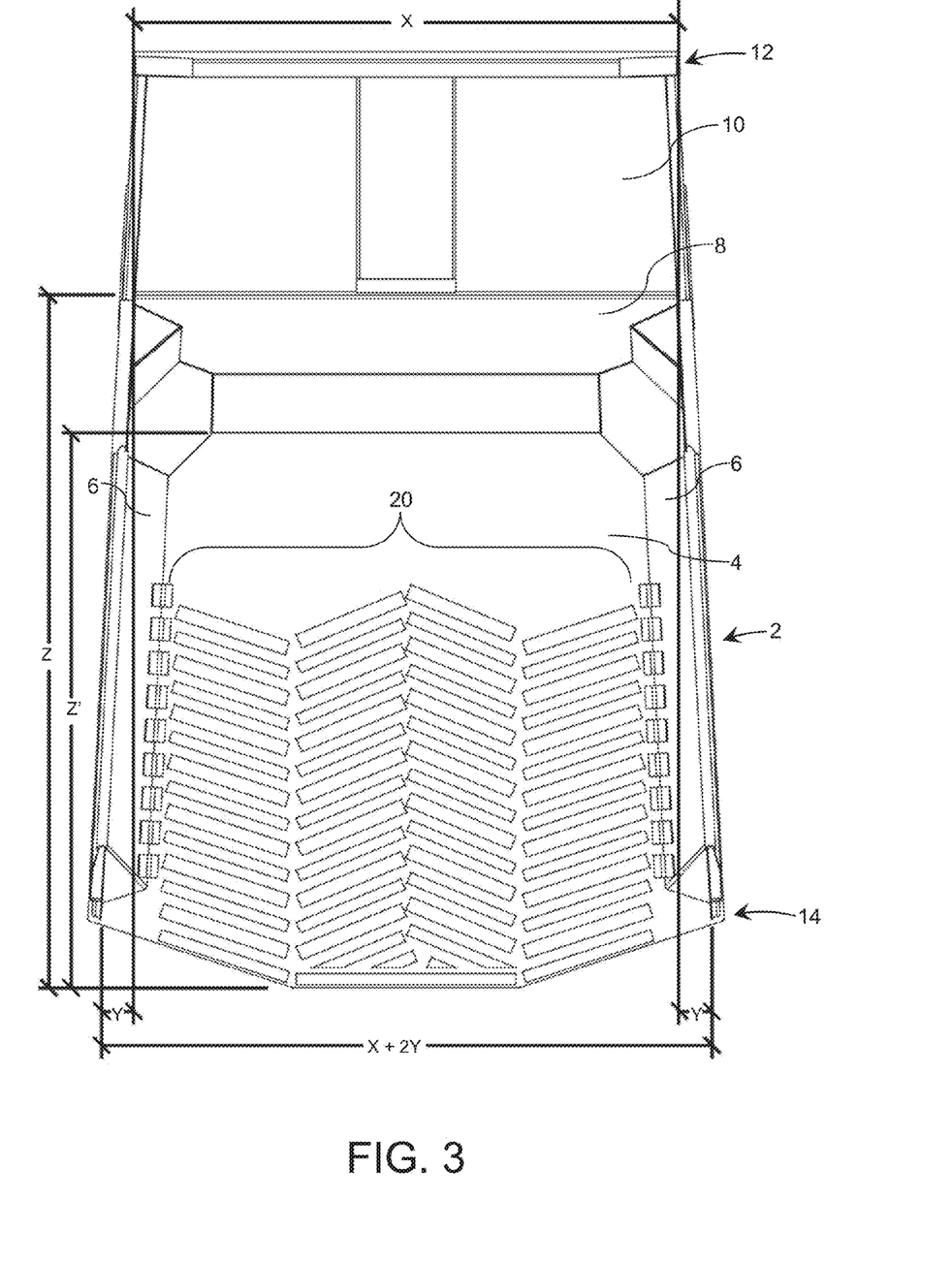
FIG. 3 is top view of a truck body illustrating an outward tapering of the body sidewalls.

Referring to FIG. 3, a truck body 2 includes a body floor 4, two sidewalls 6 and a front wall 8. A canopy 10 extends forward from the top of the truck body front wall 8 and is configured to cover the front of the corresponding truck chassis, particularly the cab. The sidewalls 6 of the truck body 2 taper outwardly from the front 12 to the rear 14 of the truck body 2. A liner structure 20 covers a portion of the truck body floor 4, as will be described in greater detail below.

To prevent abrasion of the truck body sidewalls 6, these truck body sidewalls taper outwardly at an extreme rate, as illustrated in FIG. 3. The tapering of the truck body sidewalls 6 results in the width between the truck body sidewalls 6 at the truck body 2 open rear end having an outward extension Y on each side in comparison to the width X between the truck body sidewalls at the front of the truck body. Thus, the width between the truck body sidewalls at the rear of the truck body is X+2Y compared to the width X between the truck body sidewalls at the front of the truck body. In one embodiment, each lateral extension Y is between 5 to 10% of the width X at the front, such that the width between the truck body sidewalls is between 10 and 20% greater at the truck body rear than at the front. In a preferred embodiment, the width between the truck body sidewalls at the rear of the truck body is between 10 and 15% greater than at the front of the truck body. As a particular example, the increase in width from the front to the back of the truck body sidewalls could be about 12%. In absolute terms, depending on the size of the truck body, the rear width between the truck body sidewalls may be at least 36 inches greater than the width between the truck body sidewalls at the front of the truck body.

The length of the truck body floor 4 is indicated by two different measurements in FIG. 3. The length Z is measured from the back edge of the truck body floor 4 to the junction between the front wall 8 and the canopy 10 of the truck body 2. The length Z' is measured from the back edge of the truck body floor 4 to the junction between the truck body floor 4 and the front wall 8. To give an example of the size of the bodies exemplified by the truck body 2 in FIG. 3, the typical length Z is about 25-40 feet. The ratio Z/X is (approximately) between 1.2.5 to 1.5. The ratio Z'/X is approximately between 0.85 to 1.15. Minimizing, as much as practical, the body floor 4 length, as illustrated in FIG. 3, reduces the floor area subject to hard rock mined material abrasion.

In a preferred embodiment, the particular dimensions and proportions of the truck body can be determined and designed based on the material being hauled. Specifically, the truck body 2 can be shaped and dimensioned to accommodate the correct volumetric load and to maintain a load distribution that results in the center of gravity of the load being proximate a predetermined location on the truck frame 102. In particular, the truck body can be designed to locate the center of gravity of the load at the correct position according to the manufacture of the truck chassis or frame. This can be accomplished by utilizing a load profile that is based on the actual material characteristics and loading conditions present in the specific field haulage environments where the truck body will be used, taking into account factors such as the cohesiveness of the material to be hauled and the size, shape and gradation of the pieces of material. Thus, the dimensions of the body can be customized for the particular material being hauled.

The extreme outward tapering of the truck body sidewalls provides several advantages while dumping the load that is being hauled. As the bulk of the load moves towards the rear of the truck body, and the corresponding opening of the truck body, the load relative to the body sidewalls 6 recedes away from the body sidewalls. This relative movement of the hard rock mined ore load with respect to the truck body sidewalls 6, immediately reduces the contact force between the truck body sidewalls and the load as the load moves rearward during dumping, and minimizes the likelihood of truck body sidewall abrasion.

In contrast to the truck body sidewalls, contact avoidance between the hard rock mined ore load and the body floor 4 is not possible and the loaded material scrapes over the body floor 4 as the load is dumped from the truck body. Therefore, in order to protect the underlying material that forms the surface of the body floor 4, the floor is provided with a liner structure 20 that includes a material that is harder than the material of the floor surface and, more particularly, harder than the hauled material.

In many instances, the truck body 2 will be used throughout its operational lifetime at one particular mining site. In such cases, the liner structure 20 can be particularly selected to provide a hardness that is suited for preventing abrasion caused by the particular materials being mined at this mining site. Thus, as an example, if the steel used to form the structural components of the truck body 2 is a high strength and relatively high hardness steel having a hardness of 450 Brinell, Vickers 480, the unprotected surfaces of the truck body 2 will be vulnerable to abrasive wear if the loads being hauled include materials of higher hardness (e.g., Vickers 480 or higher) than this steel. Thus, if the loaded materials include magnetite or chert, the liner structure 20 should be advantageously selected to have a Mohs scale hardness greater than 7 and a Vickers hardness greater than 1275 HV. For such an application, a suitable liner structure material could be chromium carbide, having a Mohs scale hardness around 7.5 and a Vickers hardness around 1500. Suitable constructions that provide such high hardness are commercially available and include, for example, Arcoplate® manufactured by Alloy Steel International of Australia or SAS 1750™ manufactured by SAS Global Corporation of Warren, Mich.

On the other hand, if the hauled material is harder than the structural steel forming the truck body, but not quite so hard as chert or magnetite, it may be more economical to use a softer liner structure than chromium carbide, but one that is still hard enough to adequately prevent abrasion of the underlying floor surface. For example, if the hauled material included carrolite, having a Vickers hardness between 507 and 586, it may be sufficient to line the body floor with a liner structure 20, formed of a very hard steel of 550 or 600 Brinell (Vickers 590 or Vickers 640), to be more cost effective. Thus, the material of the liner structure 20, can be specifically selected to cost-effectively suit the needs of the particular hauled material to protect the underlying floor structure.

Figure 4A:
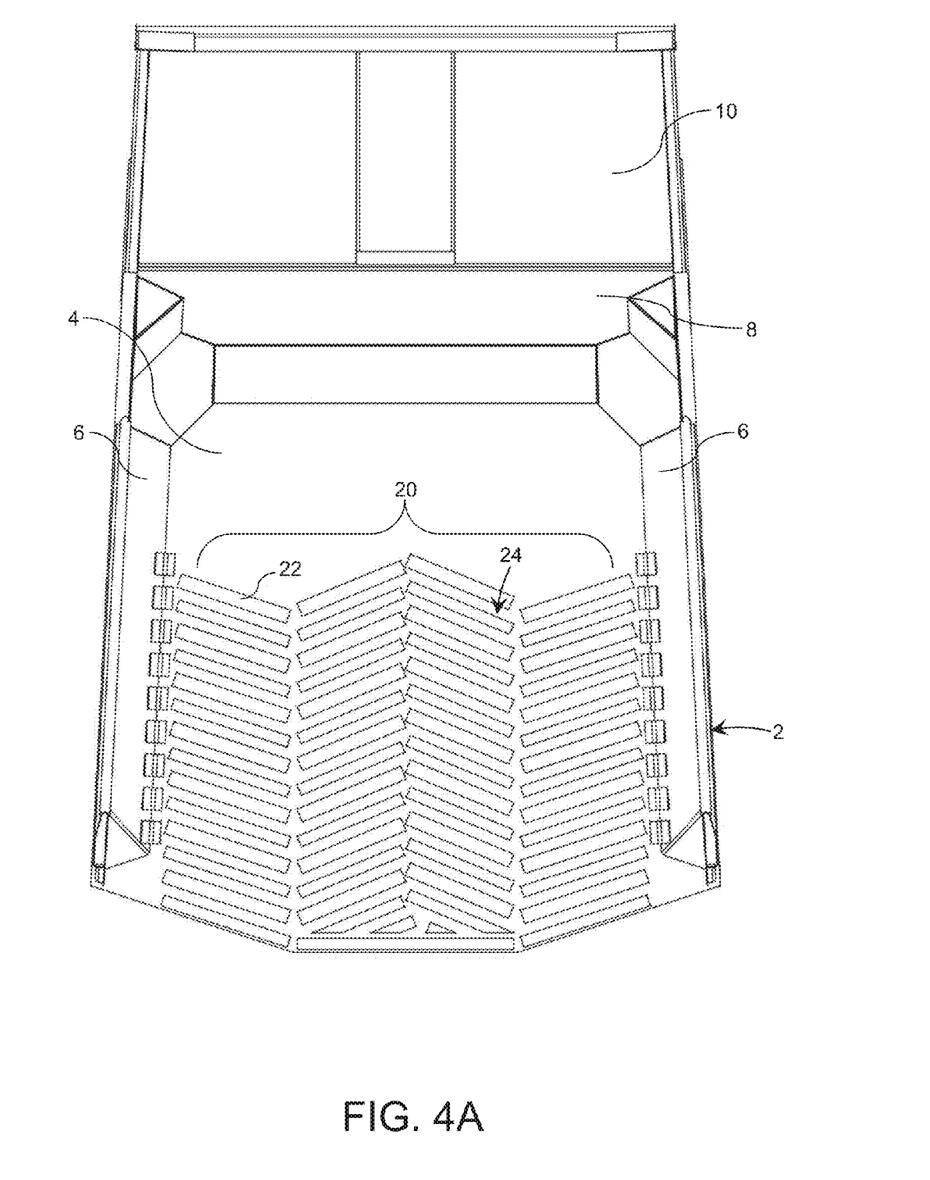
FIG. 4a is a top view of the truck body illustrating a liner structure on the truck body floor.

The liner structure 20 shown in FIG. 4a is for by a plurality of discrete pieces of lining elements. While it is possible to pro-vide the liner structure 20 as a continuous lining over a large portion of the truck body floor structure, or over the entire body floor structure 4, such extensive covering is not necessarily required to protect the floor structure 4, from abrasion. Accordingly, it can be economically advantageous to provide the liner structure 20 in discrete pieces of lining elements 22 that are separated by gaps 24. The possibility of using separated lining elements 22 comes from the realization that the abrasion of the truck body surfaces results not from the mere contact of the truck body surface with the hard rock ores, but rather from the ability of the hard rock materials to slide over a measurable portion of the surface as the load is dumped from the truck body. Thus, the lining elements 22 need not cover the entire floor surface being protected, but instead merely need to interrupt continuous paths of the underlying surface, particularly at the rear of the truck body in the longitudinal direction of the truck body, along which the load will slide when being dumped.

In the illustrated example, the discrete pieces of lining elements 22 are embodied as elongate strips that are approximately six inches wide and spaced apart along the length of the truck body by approximate six inch gaps. Preferred alternative lining elements could be up to approximately twelve inches wide and the associated gaps between liner pieces could be approximately three inches. In a preferred embodiment, the gap between lining elements along the longitudinal direction of the truck body, are no greater than eighteen inches, or more preferably no greater than twelve inches. Limiting the gap between the discrete lining elements will help prevent long exposed regions of the underlying floor structure from being abraded by the hard rock materials being hauled.

As a further measure for preventing long exposed portions of the floor surface, the lining elements 22, preferably have an orientation that is substantially perpendicular to the longitudinal, or front-to-rear, direction of the truck body. This ensures that there are no long gaps in the liner structure 20 in the longitudinal direction that could provide a path for the hard rock mined materials to scrape along the floor surface and abrade the structural material of the truck body floor. Thus, while the elongate lining elements 22 can be oriented at an angle with respect to the longitudinal direction of the truck body, as shown in the herringbone pattern of the lining elements of FIG. 4a, it is preferred that the elements be oriented closer to perpendicular to the longitudinal direction than parallel to the longitudinal direction. In other words, the discrete lining elements, with respect to the elongate direction of the pieces, are preferably disposed at an approximate angle of between 45 and 90° from the longitudinal direction of the truck body.

Figure 4B:
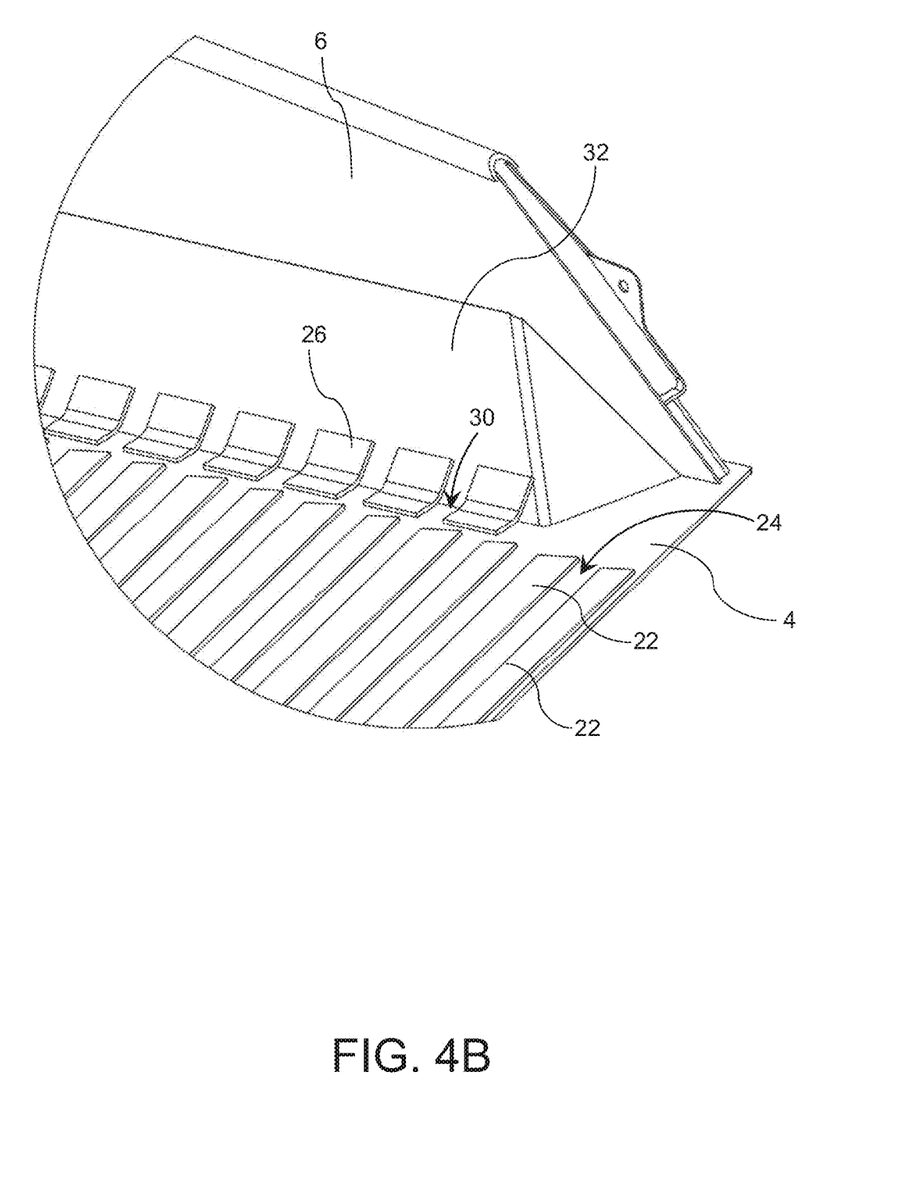
FIG. 4b is a perspective detail view of an intersection between the truck body sidewall and truck body floor.

In addition to the general surface of the truck body floor 4, the gutter 30 at the transition between the truck body floor 4 and truck body sidewalls 6 is particularly vulnerable to abrasion by hard rock mined materials. Accordingly, as shown in FIG. 4b, it is advantageous to provide transition pieces 26 of the liner structure 20 at an intersection disposed between the body floor 4 and body sidewalls 6. Preferably, the transition pieces 26 are bent so that they may cover both surfaces of an abutting intersection. In the illustrated embodiment, the transition pieces 26 are provided between the floor structure itself and a gusset plate 32 that extends between the body floor 4 and adjacent body sidewall 6. Alternatively, if the gusset plate 32 is absent, the transition pieces 26 can extend between the body floor 4 and adjacent body sidewall 6 directly.

Figure 4C:
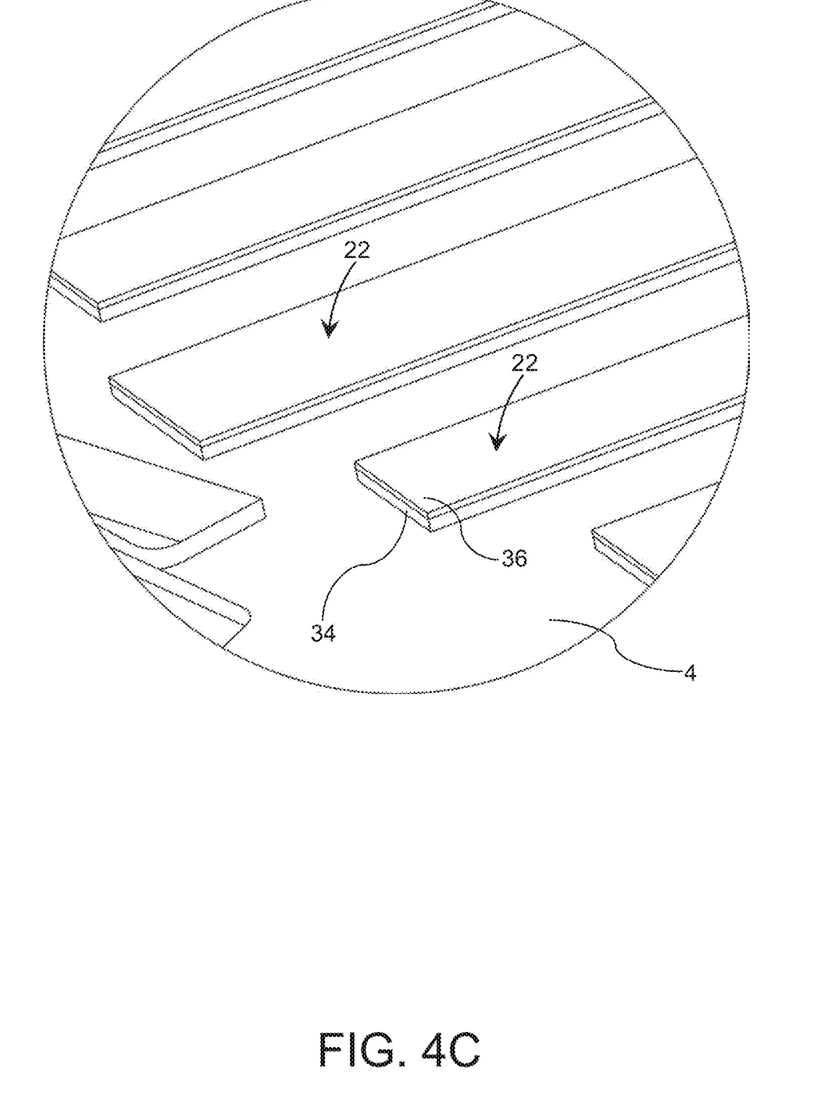
FIG. 4c is a perspective detail view of a liner structure on the truck body floor.

As mentioned previously, the liner structure 20 can be provided by various different materials, depending on the different requirements of the truck body, particularly the type of material being hauled. Thus, the liner structure 20 could be formed by lining elements 22 composed of steel strips of a particularly hard steel that are disposed over the structural steel of the truck body 2, particularly the body floor 4. Alternatively, if a harder material is needed for the liner structure 20 to accommodate harder rock mined materials, the lining elements 22 could be formed by backing plate 34 with a material overlay 36, as shown in FIG. 4c. In this particular embodiment, the lining elements 22 are provided by a steel backing plate 34 with a chromium carbide 36 overlay. The overlay can be applied to the backing plate by various methods including welding or fusing (fusing being the preferred method) the chromium carbide overlay to the backing plate. Each lining element 22 is attached to the surface of the body floor 4, for example by welding, to provide a surface that is strongly protected from wear. It is also possible, as an additional alternative, for the overlay to be applied to the floor surface directly. This is particularly feasible if the overlay is provided on the floor components prior to fabrication of the truck body.

In many embodiments the area in which the liner structure 20 is provided need not cover the entire interior of the truck body 2. In particular, the body sidewalls 6 can be mostly or entirely free of the liner structure. Likewise, a portion of the front of the truck body floor may also be free of the liner structure 20. The liner structure 20 may be unnecessary on the body sidewalls due to the abrasion avoidance resulting from the outward taper of the body sidewalls, as described above. Thus, for example, if the truck body 2 includes a gusset plate 32 at the intersection with the body floor 4, the body sidewalls 6 may be entirely free of liner structure 20 and the associated lining elements 22. On the other hand, if the body sidewalls 6 and floor 4 intersect directly, it may be advantageous to include transition pieces 26 of the liner structure 20 that spans the body floor 4 and the body sidewalls 6. However, in such a case, it can still be possible that the body sidewalls 6 are free of any lining elements 22 that exclusively cover the sidewalls 6. Thus, the lower portion of the body sidewalls 6 would only be covered by transition pieces 26 that are shared with the body floor 4. Of course, it is also possible for the liner structure 20 to cover a portion or the entirety of the body sidewalls 6.

The front portion of the truck body floor 4 may also be less susceptible to wear, and thus designed to be free of the liner structure 20. While the front portion of the body floor cannot entirely avoid sliding contact with the hauled material, a considerably smaller portion of each load will pass over the front portion of the truck body floor 4. Accordingly, compared to the rear of the truck body floor 4, the front of the truck body floor can be substantially less vulnerable to abrasion. For this reason, up to the front 25% or up to the front 75% of the truck body floor 4 may be free of the liner structure 20, as shown in FIG. 4a. Alternatively, the liner structure 20 may extend over an area covering the entire length of the truck body floor, as shown in FIG. 5.

Figure 5:
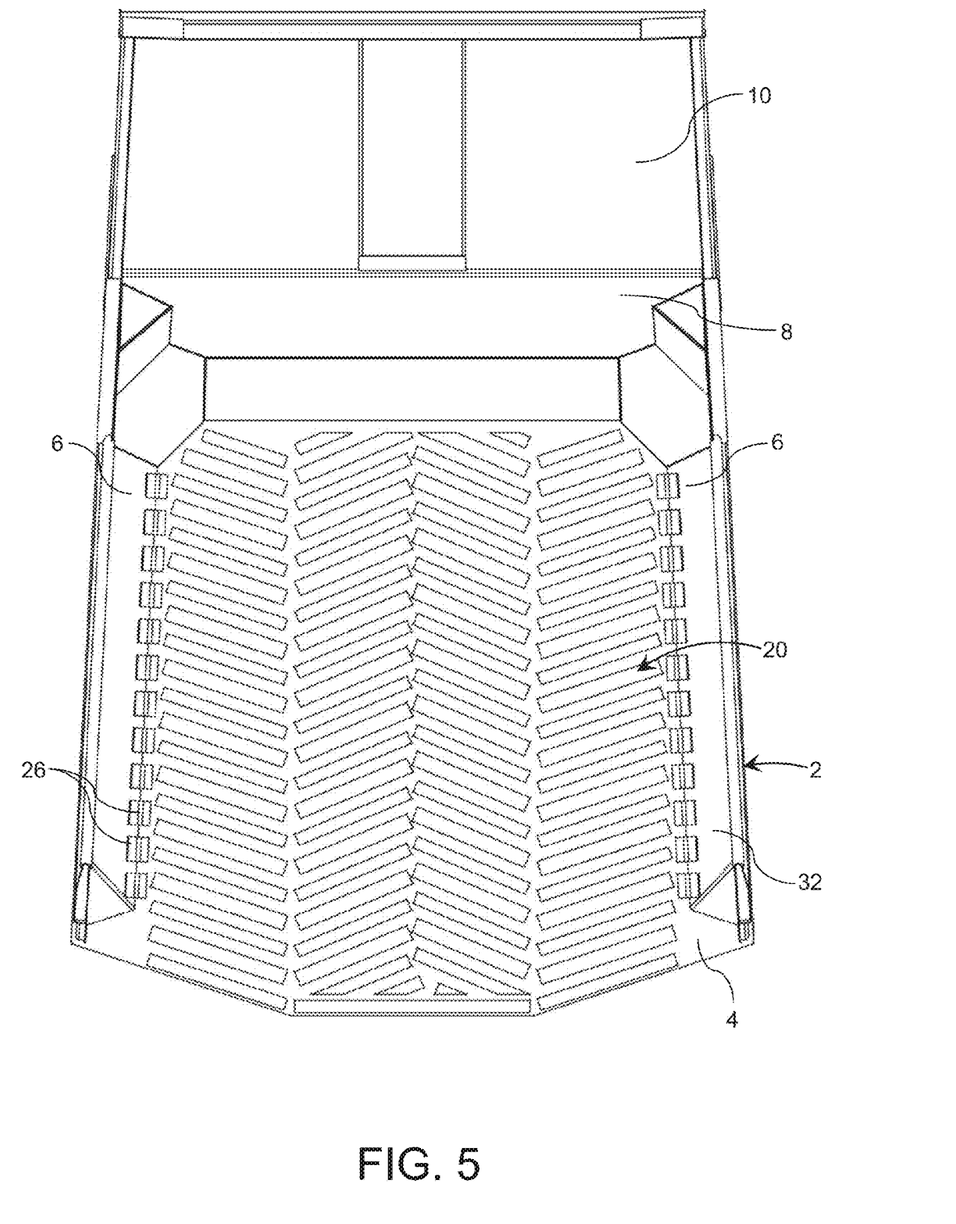
FIG. 5 is a top view of a truck body with an alternative liner structure configuration.
Figure 6:
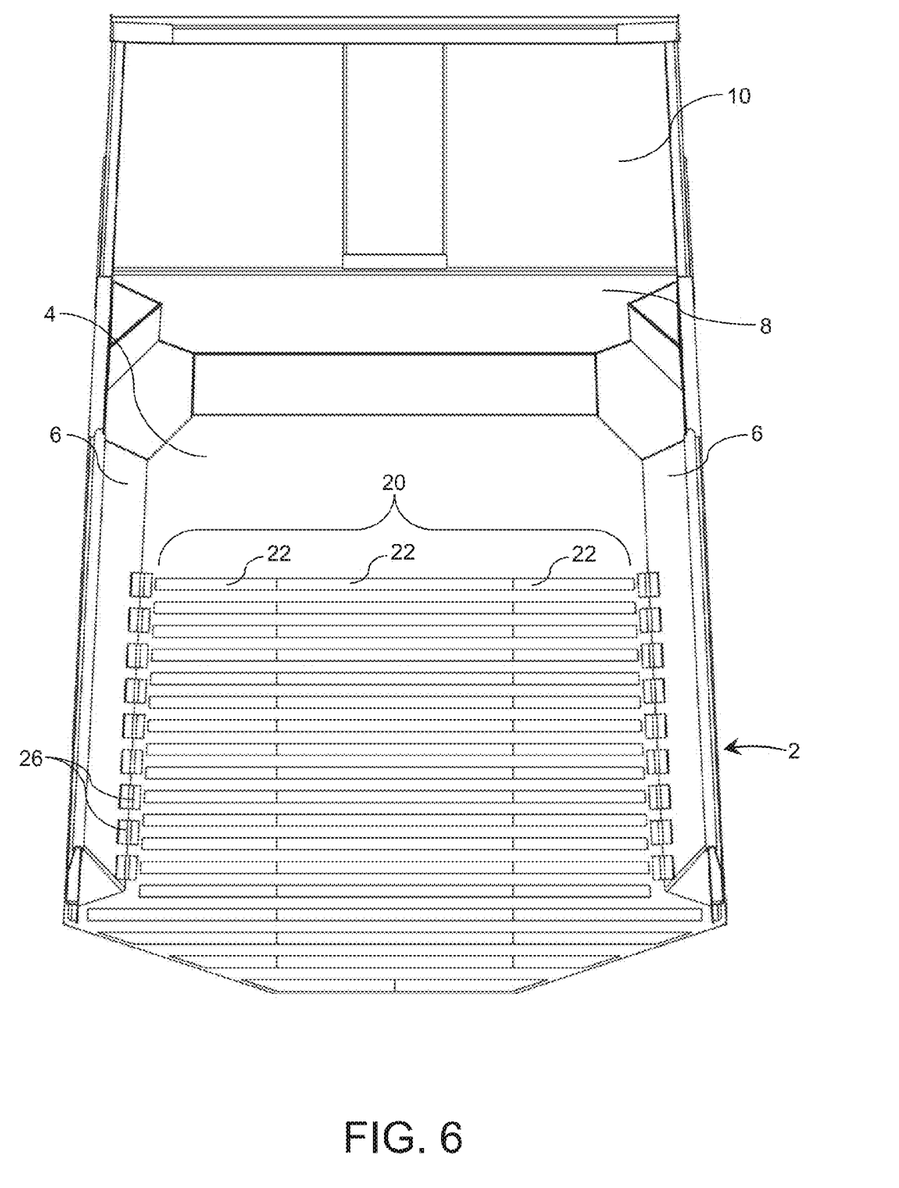
FIG. 6 is a top view of a truck body with another alternative liner structure configuration.
Figure 7:
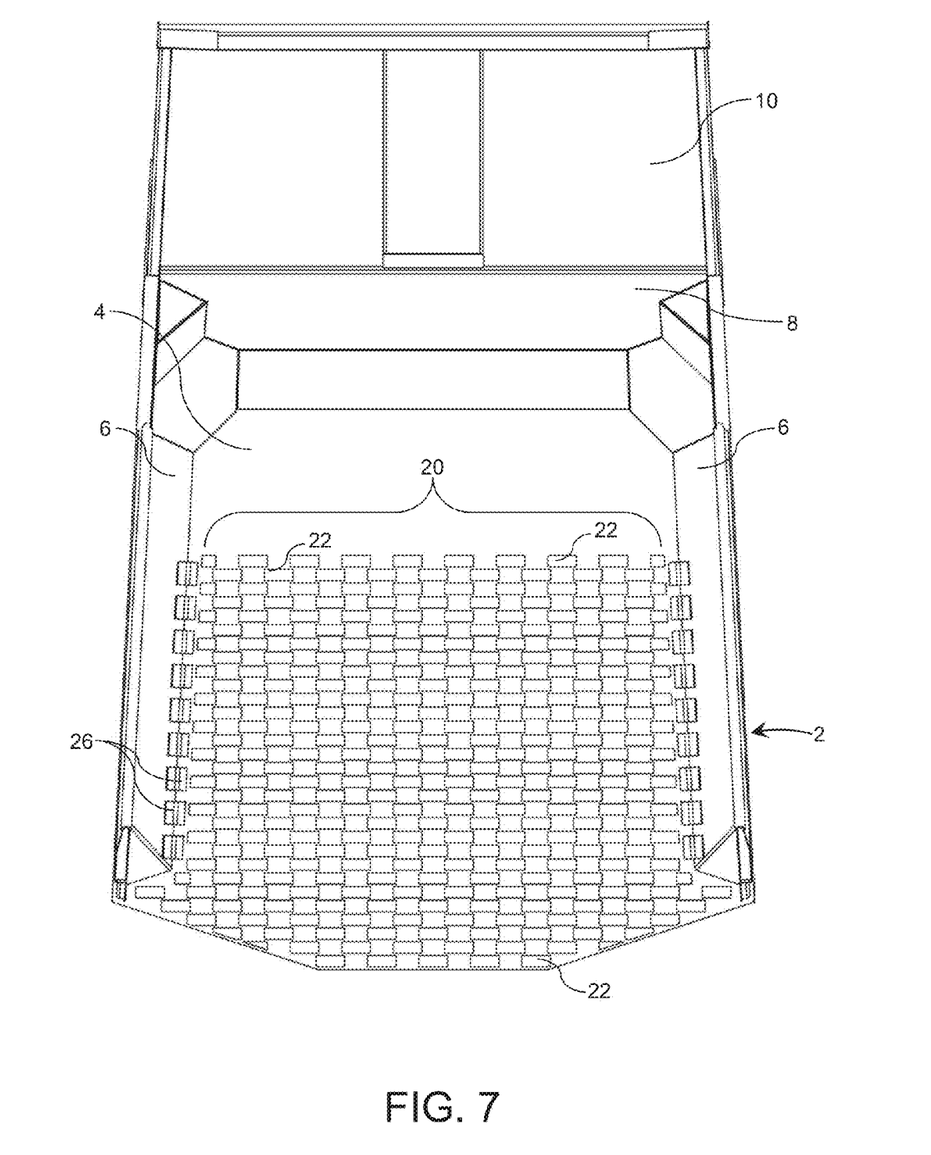
FIG. 7 is a top view of a truck body with yet another alternative liner structure configuration.
Figure 8:
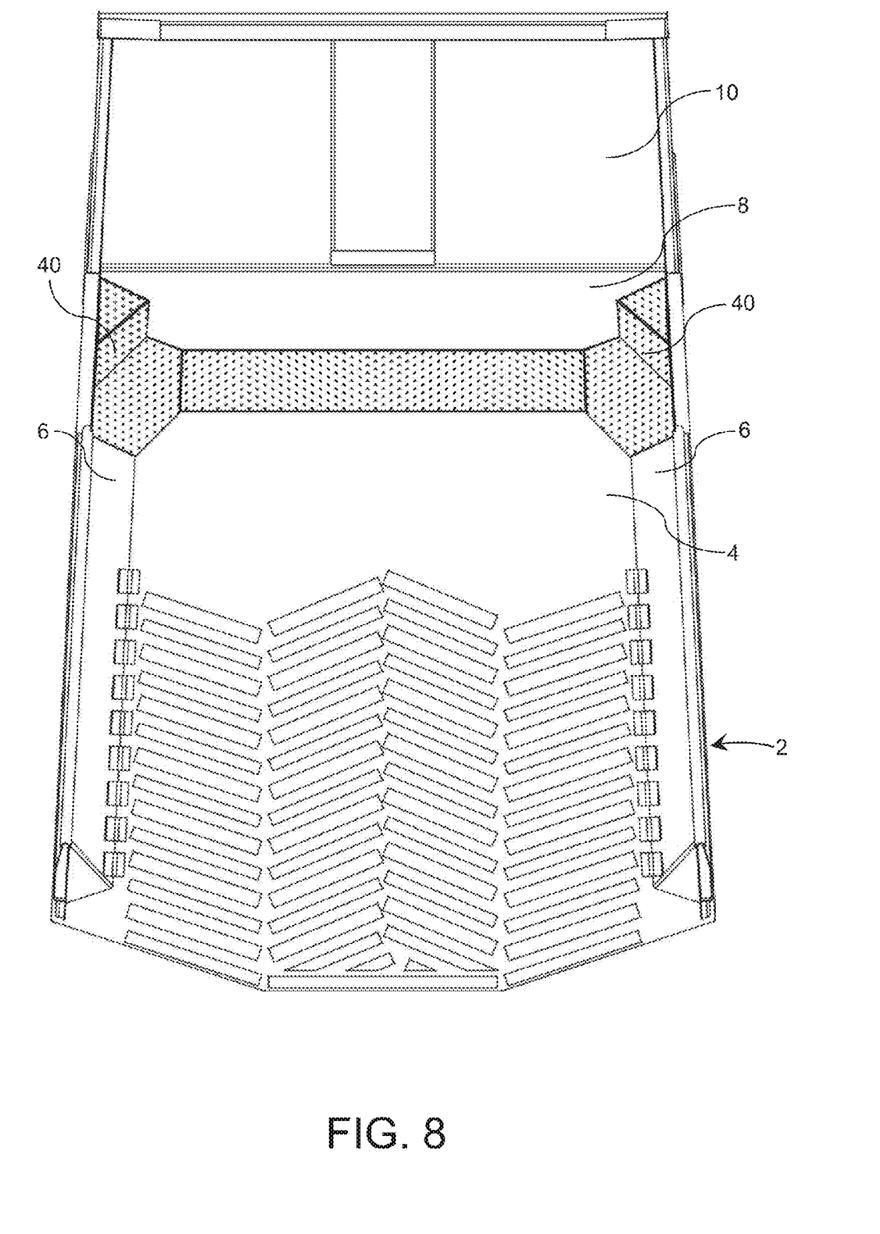
FIG. 8 is a top view of a truck body with a liner structure and a non-stick surface bridging an intersection between the body floor, body front wall and body sidewall.

Aside from the herringbone configuration of the liner structure 20 shown in FIGS. 3-5, the liner structure 20 could be configured in various alternative patterns, as shown in FIGS. 6 and 7. For example, in FIG. 6, the liner structure 20 is provided in strips that extend across an entire width of the truck body floor 4. As illustrated, these long strips can be formed by individual lining elements 22 with abutting ends. FIG. 7 shows another alternative pattern of the liner structure 20 including lining elements 22 that are spaced apart from neighboring lining elements along the longitudinal direction of the truck body 2, but offset and overlapping with adjacent lining elements in the lateral direction.

In addition to the abrading that can occur as truck bodies haul extremely high hardness hard rock ores, these same ores may in certain circumstances contain considerable impurities which may cause the hauled materials to amalgamate and stick to surfaces of the truck bodies 2. This sticking of material typically starts in the front corners of the truck body and then progressively extends to build and transgress rearward from the front corners of the truck body. To combat this phenomenon, the truck body 2 can include a non-stick surface 40 bridging the intersection of the truck body floor 4, one of the truck body sidewalls 6 and the truck body front wall 8. It should be understood that the intersection of the truck body floor 4, truck body front wall 8 and opposite truck body sidewall 6 can also be bridged by a mirror-image non-stick surface 40. In this context, the term bridging is used to indicate that the non-stick surface extends from one of the truck body components (i.e., floor, sidewall or front wall) to another. This can be achieved by one or more distinct plates with a non-stick material that extends across the intersections and abuts each of the corresponding truck body components, as shown in the FIG. 8, or it can be achieved by a surface section of the truck body components, near the intersection, being covered with a non-stick material. The use of distinct plates having a non-stick surface may be advantageous because the distinct plates can cover the intersection between the truck body components, and thus avoid the geometry of a sharp edge between two components or a distinct corner between all three components. This is advantageous because sharp edges and corners are more likely to capture material being hauled and provide a starting point for material sticking to the truck body, i.e. "carryback."

The term non-stick surface is used herein to encompass hydrophobic surfaces and/or oleophobic surfaces. The term hydrophobic refers to any surface, such as a treated steel or a painted surface, on which water beads are formed when water contacts the surface. A hydrophobic surface is exemplified by poor wetting, poor adhesiveness and having a 'low' free surface energy/adhesion. Relative terms are used to indicate the degree of hydrophobicity of a material or surface, where surfaces with water contact angles greater than 90° are called hydrophobic while surfaces with water contact angles greater than 150° are called super-hydrophobic. Just as water is repelled by hydrophobic materials, so can oil and petroleum products be repelled by oleophobic and super-oleophobic materials or surfaces. The non-stick surface described herein can be hydrophobic, super-hydrophobic, oleophobic, super-oleophobic or any combination thereof. Various different constructions can be used to make the hydrophobic or oleophobic non-stick surface. For example, prefabricated hydrophobic plates, such as CRODON® steel plates manufactured by Chromium Corporation of Dallas, Tex., can form the non-stick surface coated plates, which is then attached to the existing components of the truck body 2.

Embodiments of the invention also include methods of designing and fabricating the hard rock mined ore truck body as well as transporting hard rock mined ores using a vehicle equipped with the truck body.

Figure 9:
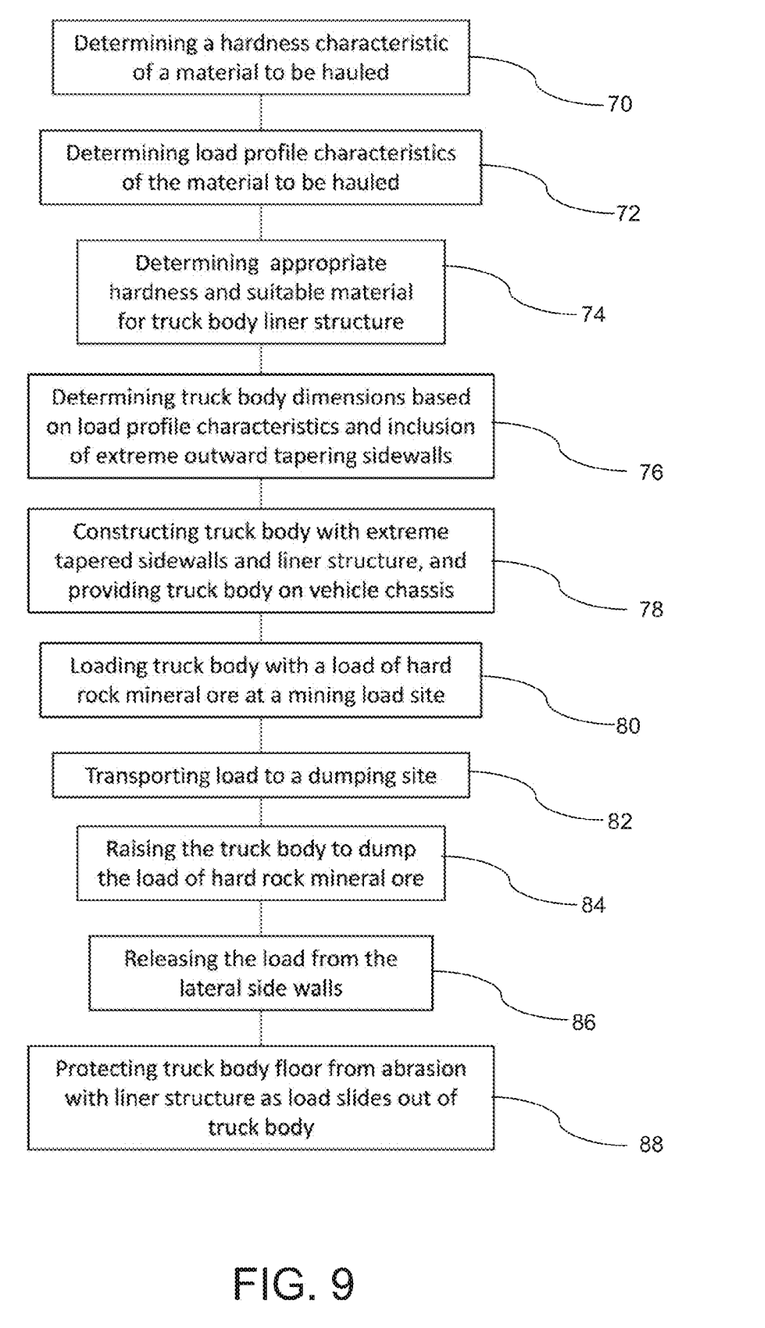
FIG. 9 is a flow chart showing a method of making and using a truck body for transporting hard rock mined ore.

FIG. 9 is a flow diagram illustrating a method that includes steps for both providing a vehicle with a truck body that is configured for hauling hard rock mined ore materials from a loading site to a dumping site.

In addition to the construction of a general truck body that is configured for hauling material having a hardness that is greater than the structural steel components of the truck body, which includes providing the truck body with extreme tapered body sidewalls and a liner structure, as depicted at 78 in FIG. 9, the truck body can also be customized in design and construction to carry a particular material. In the method for creating such a truck body, certain characteristics of the material are first determined, including a hardness characteristic and a load profile characteristic, as shown at 70 and 72. For example, if the material is homogenous, a value of a particular hardness scale can be determined for the material, or if the material includes various components, a hardness value of the hardest component can be determined. Exemplary load profile characteristics that might be determined include the angles of material repose that are formed when the material is loaded and hauled and the size and shape of a plateau that forms on the top of the load of the material being hauled.

Based on the determined hardness characteristic, if needed an appropriate minimum hardness for the liner structure can be determined that is greater than the hardness of the material being hauled. Using this minimum hardness value, an appropriate material can then be determined if needed for the liner structure at 74. Likewise, using the load profile characteristics in combination with the vehicle capacity, the size and relative dimensions of the truck body can be calculated to efficiently load and transport the load in the truck body 2 with the selected material at 76. Once the design of the truck body having the extreme outwardly tapered sidewalls is completed, the truck body can be constructed and if needed the liner structure mounted on the surfaces of the truck body at 78, particularly the body floor. In an alternative embodiment, the liner structure can be provided on portions of the truck body particularly the body floor before final assembly of the truck body. Finally, the truck body 2 is mounted on the chassis of an appropriate vehicle, such as an off-highway truck, at 78.

The constructed vehicle can then, haul and dump the particular materials that it was designed for. First, at 80, the truck body is loaded with the hard rock mined ore at a loading site within the mine site. The vehicle then transports the load, at 82, to a dumping site where the load of hard rock mined ore will be unloaded from the truck body. At the dumping site, the truck body is raised at 84, for example using hydraulic cylinders 108 about a pivot point 106 as shown in FIG. 2. The lifting of the truck body 2 causes the load to slide out of the truck body at the rear thereof. Wear of the truck body during the unloading procedure is avoided because the load is laterally released from the sidewalls of the truck body 2, at 86, due to the outward tapering of the truck body sidewalls, which prevents abrasion of the truck body sidewalls. Abrasion of the truck body floor is also prevented, at 88, because the truck body floor is protected from abrasion by the liner structure 22 as the load is dumped.

While the invention has been particularly shown and described with reference to preferred embodiments thereof, it will be understood by those skilled in the art that various changes in form and details may be made therein without departing from the spirit and scope of the invention.

The invention claimed is:

1. A truck body for transporting hard rock mined ore, the truck body comprising;
   a body floor having an edge at which the hard rock mined ore loaded into the body is released when the body is moved into a dumping position, the body floor including a first material forming a floor surface and a liner structure of a second material covering at least a portion of the floor surface, the second material having a hardness that is higher than both a hardness of the first material and a hardness of the hard rock mined ore;
   a body front wall for confining a load of the hard rock mined ore;
   two opposing body sidewalls for confining the load at opposing sides of the truck body, the sidewalls tapering outwardly from front to rear of the truck body such that a width between the body sidewalls at the rear of the truck body is greater than a width between the body sidewalls at the front of the truck body, the outward tapering of the body sidewalls promoting movement of the load away from the body sidewalls as the load is released from the truck body; and
   a non-stick surface bridging an intersection of the body floor and one of the body front wall and the body sidewalls.

2. The truck body recited in claim 1, wherein the liner structure is formed by a plurality of discrete pieces arranged in a pattern over the floor surface.

3. The truck body recited in claim 2, wherein the discrete pieces are spaced apart such that a gap is formed between adjacent pieces of the liner structure.

4. The truck body recited in claim 2, wherein the discrete pieces include a plurality of elongate strips, each extending in a direction that is at an angle between 45° and 90° from a longitudinal axis of the truck body.

5. The truck body recited in claim 1, wherein the liner structure includes a chromium carbide overlay.

6. The truck body recited in claim 1, wherein the liner structure includes a material having a Mohs scale hardness of at least 7 and a Vickers hardness of at least 1280 HV.

7. The truck body recited in claim 1, wherein a majority of the body sidewalls are free of the liner structure.

8. The truck body recited in claim 1, wherein an entirety of the body sidewalls is free of the liner structure.

9. The truck body recited in claim 1, wherein a gusset plate is disposed at an intersection between each body sidewall and the body floor, and wherein the liner structure includes transitions pieces that extend between the body floor and the gusset plate.

10. The truck body recited in claim 1, wherein the width between the truck body sidewalls at the rear of the truck body is 10% to 15% greater than the width between the truck body sidewalls at the front of the truck body.

11. The truck body recited in claim 1, wherein the width between the body sidewalls at the rear of the truck body is at least 36 inches greater than the width between the body sidewalls at the front of the truck body.

12. The truck body recited in claim 1, wherein the non-stick surface includes a material that is one or both of hydrophobic and oleophobic.

13. The truck body of claim 1 wherein the non-stick surface comprises a third material.

14. A truck body for hauling hard rock mined ore that is harder than a structural material of the truck body, the truck body comprising:
   a body floor having an edge at which hard rock mined ore loaded into the body is released when the body is moved into a dumping position, the body floor including a floor surface formed by the structural material;
   a body front wall for confining a load of the hard rock mined ore;
   two opposing body sidewalls for confining the load at opposing sides of the truck body; and
   a non-stick surface bridging an intersection of the body floor and one of the body front wall and the body sidewalls;
   a means for covering at least a portion of the floor surface of the body floor so as to protect the floor surface from abrasion by the hard rock mined ore during dumping of the load; and
   a means for removing lateral confinement of the load during dumping so as to protect the body sidewalls from abrasion by the hard rock mined ore during dumping.

15. The truck body recited in claim 14, wherein a majority of the body sidewalls are free of the means for covering at least a portion of the floor surface.

16. The truck body recited in claim 14, wherein the the non-stick surface includes a material that is one or both of hydrophobic and oleophobic.

17. The truck body recited in claim 14, wherein the means for covering at least a portion of the floor surface of the body floor is formed by a plurality of discrete pieces arranged in a pattern over the floor surface.

18. The truck body of claim 14 wherein the non-stick surface comprises a third material.

19. A truck body for transporting hard rock mined ore, the truck body comprising;
   a first material forming a floor surface supporting the hard rock mined ore;
   a liner structure of a second material covering at least a portion of the floor surface, the second material having a hardness that is higher than both a hardness of the first material and a hardness of the hard rock mined ore, wherein a selection of the second material from a group of possible materials depends on the hardness of the hard rock mined ore;
   opposing body sidewalls configured for confining the hard rock mined ore, the sidewalls tapering outwardly such that a distance X separating the body sidewalls at a forward end of the opposing sidewalls is less than a distance X+2Y separating the body sidewalls at a rearward end of the opposing sidewalls, where Y is proportional to a degree of taper for each of the sidewalls; and
   a non-stick surface bridging an intersection of the body floor and one of the the body front wall and the body sidewalls.

20. The truck body recited in claim 19, wherein the non-stick surface includes a material that is one or both of hydrophobic and oleophobic.

21. The truck body of claim 14 wherein the non-stick surface comprises a third material.

* * * * *